United States Patent [19]
Gustafsson

[11] Patent Number: 5,676,739
[45] Date of Patent: Oct. 14, 1997

[54] MOISTURE-ABSORBING DEVICE

[76] Inventor: Bror Gustafsson, Tylöhusvägen 16, S-302 73 Halmstad, Sweden

[21] Appl. No.: 702,443
[22] PCT Filed: Mar. 24, 1995
[86] PCT No.: PCT/SE95/00312
  § 371 Date: Sep. 24, 1996
  § 102(e) Date: Sep. 24, 1996
[87] PCT Pub. No.: WO95/26914
  PCT Pub. Date: Oct. 12, 1995

[30] Foreign Application Priority Data

Mar. 31, 1994 [SE] Sweden .................. 9401094

[51] Int. Cl.$^6$ ........................... B01D 53/14
[52] U.S. Cl. ................. 96/119; 55/280; 55/424; 96/147; 206/204
[58] Field of Search ............. 95/91, 117; 96/118, 96/119, 120, 147; 55/280, 395, 424, 425, 421, 423, 429; 206/204

[56] References Cited

U.S. PATENT DOCUMENTS

| | | | |
|---|---|---|---|
| 913,325 | 2/1909 | Touzimsky | 96/119 |
| 2,702,089 | 2/1955 | Engelder | 96/118 |
| 2,943,169 | 6/1960 | Rice | 96/147 |
| 3,248,862 | 5/1966 | Lovercheck | 96/119 |
| 4,319,679 | 3/1982 | Gustafsson | 96/119 |
| 4,394,144 | 7/1983 | Aoki | 206/204 |
| 4,614,528 | 9/1986 | Lennen | 96/147 |
| 5,148,613 | 9/1992 | Cullen | 96/119 |
| 5,500,038 | 3/1996 | Dauber et al. | 96/147 |

FOREIGN PATENT DOCUMENTS

| | | |
|---|---|---|
| 0 212 029 | 3/1987 | European Pat. Off. . |
| 2691700 | 12/1993 | France .................. 206/204 |
| 5-293329 | 11/1993 | Japan .................. 96/118 |
| 6-142436 | 5/1994 | Japan .................. 96/118 |
| 6-210123 | 8/1994 | Japan .................. 96/118 |
| 420270 | 9/1981 | Sweden . |
| 464563 | 5/1991 | Sweden . |
| WO 81/01995 | 7/1981 | WIPO . |
| WO 93/14996 | 8/1993 | WIPO . |

Primary Examiner—Duane S. Smith
Attorney, Agent, or Firm—Burns, Doane, Swecker & Mathis, L.L.P.

[57] ABSTRACT

A moisture absorbing device includes a tube which is made of board coated with plastic and which in its longitudinal direction is divided into an upper chamber containing a moisture-absorbing agent and a lower chamber containing a liquid-collecting member and communicating with the upper chamber via a liquid-permeable member. The tube has at least one opening on a level with the upper chamber. A netting element, which has at least one fine-meshed netting portion, is so attached to the inside of the tube that the netting portion is located in front of the opening. The liquid-collecting member includes a liquid-tight container connected to the liquid-permeable member.

20 Claims, 2 Drawing Sheets

MOISTURE-ABSORBING DEVICE

BACKGROUND AND SUMMARY OF THE INVENTION

This invention concerns a moisture-absorbing device in the form of a tube, which in its longitudinal direction is divided into an upper chamber containing a moisture-absorbing agent and a lower chamber containing a liquid-collecting means and communicating with the upper chamber via a liquid-permeable means.

WO 93/14996 discloses a moisture-absorbing device of this type, which is intended to absorb moisture in a container, whose walls have stiffening folds forming vertical grooves on the inside of the walls, and is for this purpose positioned in such a groove. The tube of this prior-art device is made of a fine-meshed steel-wire netting. The upper chamber contains a moisture-absorbing agent in the form of calcium-chloride flakes, and the lower cheer contains a liquid-collecting means in the form of liquid-absorbing particles of an agent marketed under the trade name of SKAMOL. The liquid-permeable means provided between the upper and the lower chamber here is a partition consisting of a steel-wire netting. Being larger than the meshes of the steel-wire netting forming the tube, the calcium-chloride flakes and the Skamol particles are retained in the tube, while air is allowed to enter. Since these flakes and particles are larger than also the meshes of the steel-wire netting forming the partition, they are retained in their respective chambers, while liquid is allowed to pass through the partition.

However, the prior-art device described above suffers from certain drawbacks. If the device is handled carelessly, for instance during transport, the steel-wire netting forming the tube may easily be damaged, thus allowing flakes and particles to escape from the tube. When the liquid-absorbing particles are saturated with liquid, liquid may escape from the device and damage the goods kept in the container.

One object of the present invention is to provide a moisture-absorbing device obviating these drawbacks and in addition being inexpensive and easy to produce.

According to the invention, this object is achieved by a device which is of the type stated by way of introduction and which is wherein the tube is made of board coated with plastic and has at least one opening on a level with the upper chamber, a netting element, which has at least one fine-meshed netting portion, is so attached to the inside of the tube that the netting portion is located in front of said opening, and the liquid-collecting means consists of a liquid-tight container connected to the liquid-permeable means.

Preferably, the tube is made of corrugated fiberboard. Conveniently, the netting element has a collar corresponding to each opening in the tube, said collar having an outer circumferential shape that corresponds to the respective openings and extending into the opening so as to close the flute tubes opening in said opening.

The netting element is preferably made of plastic and glued to the inside of the tube.

In a preferred embodiment, the liquid-permeable means comprises a non-return valve means which is liquid permeable only in the direction from the upper chamber to the lower chamber.

Suitably, the liquid-collecting means is a plastic bag.

BRIEF DESCRIPTION OF THE DRAWINGS

The invention will now be described in more detail with reference to the accompanying drawings, in which.

DETAILED DESCRIPTION

Figure 1:
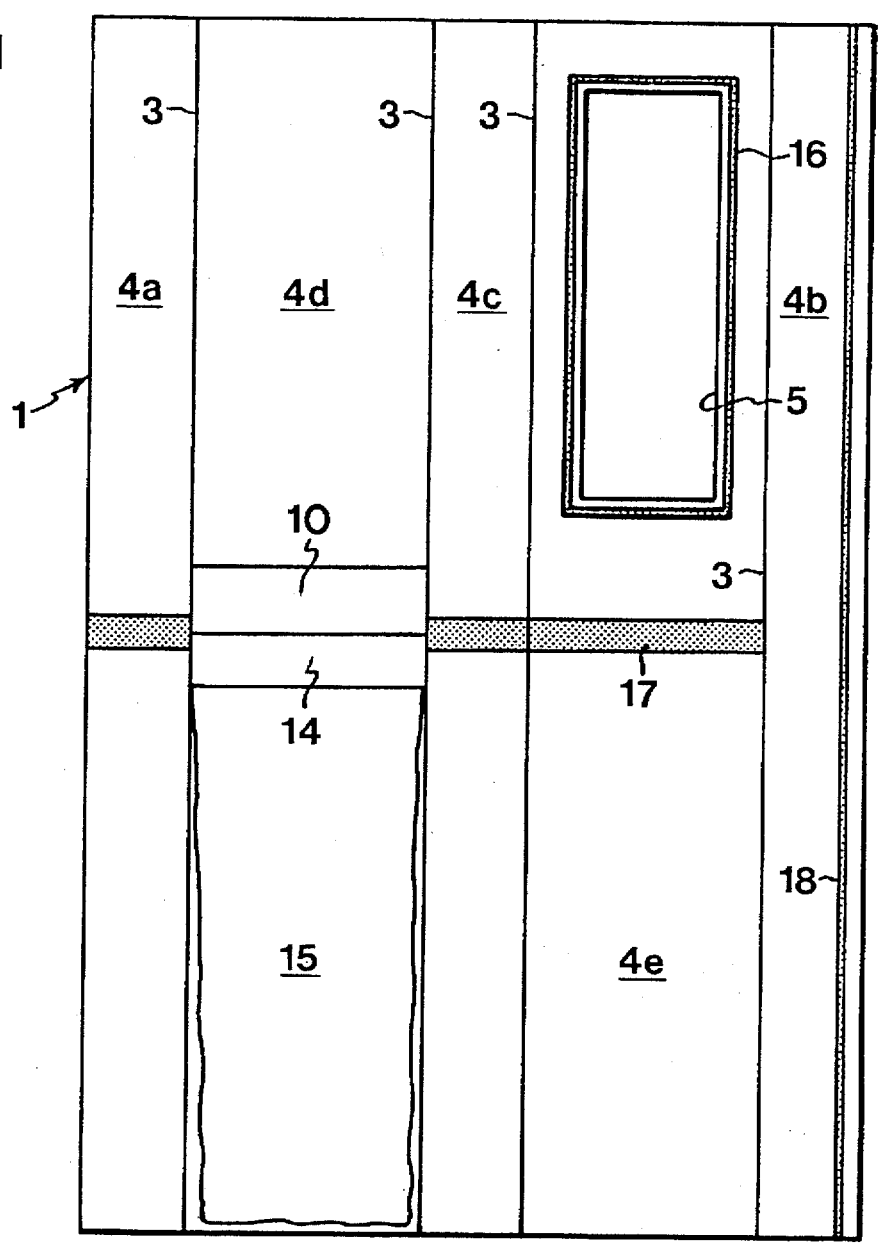
FIG. 1 is a top plan view showing a corrugated fibreboard from which a tube is to be produced, as well as a unit placed on the board and consisting of a connecting element and a plastic bag.
Figure 4:
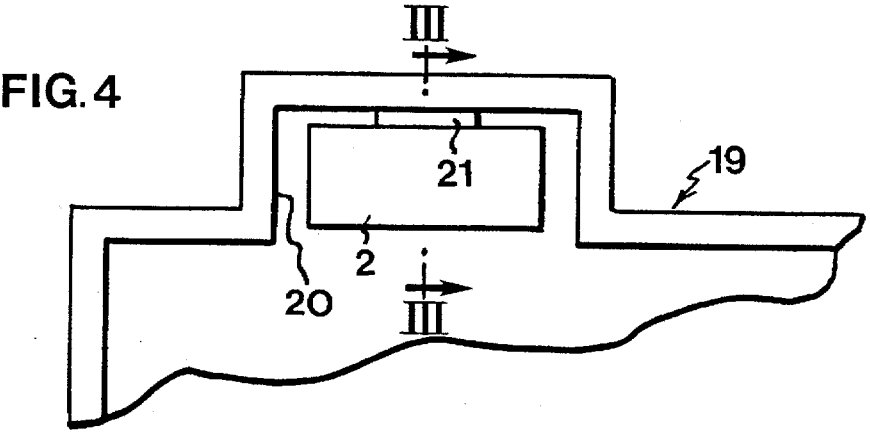
FIG. 4 is a view of a corner portion of a container, in which is placed a device according to the invention.

FIG. 1 shows a rectangular corrugated fiberboard 1 which on both sides is coated with plastic and from which is to be produced a tube 2 (FIGS. 3 and 4) of rectangular cross-section. To this end, the board 1 is formed with four vertical creases 3 along which it is to be folded. The creases 3 divide the board 1 into five panels, namely two narrow outer panels 4a and 4b, one narrow central panel 4c, and two broad intermediate panels 4d and 4e provided on opposite sides of the central panel 4c. When the board 1 is folded to form the tube 2, the narrow outer panel 4b is placed on the outside of the narrow outer panel 4a and is glued thereto, as will be described in more detail below.

At its upper part, the one intermediate panel 4e is formed with a rectangular opening 5 taking up most of the surface area of the upper panel half. Instead of a single large opening 5, the intermediate panel 4e may be formed with a plurality of minor openings distributed over essentially the same surface area.

Figure 2:
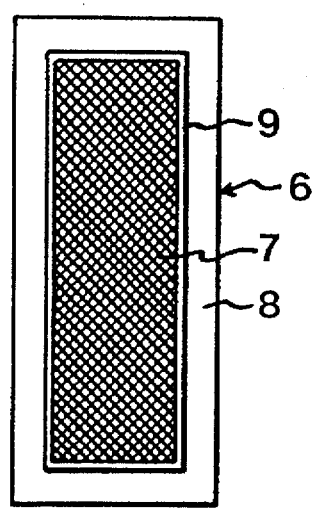
FIG. 2 is a top plan view showing a netting element.

FIG. 2 shows a sheetlike netting element 6, which is injection-moulded of polyethylene and which has a rectangular, fine-meshed netting portion 7 surrounded by a rectangular frame 8. The netting portion 7 is also surrounded by a collar 9 projecting from one side of the netting element 6. The collar 9 has an outer circumferential shape corresponding to the opening 5 and projects from the netting element 6 a distance corresponding to the thickness of the corrugated fibreboard 1, in order to extend into the opening 5 and close the flute tubes opening therein (see FIG. 3). If, instead of a single large opening 5, the intermediate panel 4e is formed with a plurality of minor openings, the number of collars equals the number of openings, and the collars have a circumferential shape corresponding to these openings, so as to serve the same purpose as the collar 9.

Figure 3:
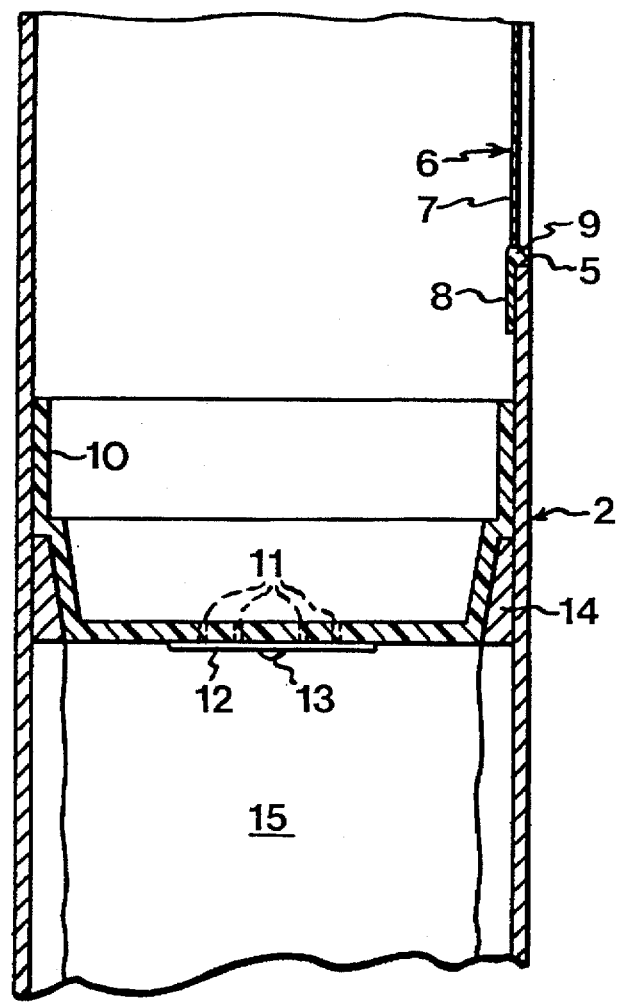
FIG. 3 is an enlarged vertical section, taken along line 3—3 in FIG. 4, of a portion of a device according to the invention, showing the connecting element in more detail.

The connecting element 10 shown in FIG. 3 is made of polyethylene and has a rectangular cross-section (as seen from above). The connecting element 10 is in the form of a bowl which, at its upper portion, has vertical walls and, at its lower portion, has walls which are slightly inclined inwards and downwards. At the upper portion, the external dimensions of the connecting element 10 are identical with the internal dimensions of the tube 2. The bottom of the bowl is formed with a plurality of outlet holes 11, which in groups are covered by two external discs 12 of rubber, such as silicone rubber, which each are attached to a pin 13 projecting from the underside of the bowl. The outlet holes 11 and the rubber discs 12 form a non-return valve allowing liquid to pass from the top downwards, but not in the opposite direction.

A retaining ring 14, which is of rectangular cross-section and whose external dimensions are identical with those of the bowl at the upper portion, is also associated with the connecting element 10. Internally, the retaining ring 14 has such downwardly-diminishing cross-sectional dimensions that it can be applied to the lower portion of the bowl so as to clamp the open end of a plastic bag 15 thereto. As is evident from the following, the plastic bag 15 is to serve as liquid-collecting means in the moisture-absorbing device.

When producing a moisture-absorbing device according to the invention, the plastic bag 15 is attached to the connecting element 10 by means of the ring 14 in the manner illustrated in FIG. 3.

The corrugated fiberboard 1 is placed on a flat surface and provided with a glue thread or string 16 extending round the opening 5, a broad and fairly thick glue thread or string 17 extending transversely across the panels 4a, 4d, 4c and 4e approximately in the middle thereof, as well as a glue thread or string 18 extending along the entire panel 4b.

The unit formed of the connecting element 10 and the plastic bag 15 is then placed on the broad intermediate panel 4d of the laid-out corrugated fiberboard 1 in the manner illustrated in FIG. 1, the connecting element 10 being placed on the glue thread 17. The netting element 6 is placed over the opening 5 in the broad intermediate panel 4e of the corrugated fiberboard 1, such that the collar 9 arranged round the netting portion 7 is inserted in the opening 5 and closes the flute tubes opening therein, so as to prevent moisture from penetrating into the corrugated fiberboard material through these. The frame 8 is fixed to the panel 4e of the corrugated fiberboard 1 with the aid of the glue thread 16. Then, the corrugated fiberboard 1 is folded about the connecting element 10 and the plastic bag 15 in order to form the tube 2. After the folding operation, the panels 4a and 4b are pressed against each other and are thus interconnected by the glue thread 18.

The connecting element 10 now divides the tube 2 into an upper chamber and a lower chamber, which communicate with each other only by means of the non-return valve formed of the outlet holes 11 and the rubber discs 12 and allowing liquid to pass only in the direction from the upper chamber to the lower chamber.

The upper chamber is filled with a moisture-absorbing agent, for instance flakes of calcium chloride, whereupon a lid (not shown) is applied to the upper end of the tube 2. Likewise, a lid (not shown) is applied to the lower end of the tube 2.

Finally, a shrink film (not shown) is so applied round the upper portion of the tube 2 that it covers the opening 5 and the upper lid, thus preventing bits of the moisture-absorbing agent from falling out as well as the upper lid from coming loose when the device is handled or transported carelessly. It goes without saying that the shrink film is removed when the device is to be used.

When the device is in operation, air enters the upper chamber through the opening 5 and the netting portion 7, and moisture contained in the air is absorbed by the moisture-absorbing agent. The resulting liquid flows through the non-return valve 11, 12 down into the plastic bag 15. The liquid collected in the plastic bag 15 is retained therein, being prevented from returning to the upper chamber even if the device is turned upside-down.

The moisture-absorbing device according to the invention is advantageously employed in a container 19 (FIG. 4) having vertical pockets or grooves 20 formed on the inside of the container walls by the stiffening folds of the container 19. Conveniently, the device is attached to the container wall by means of a double-adhesive tape 21.

I claim:

1. A moisture-absorbing device in the form of a tube, which in its longitudinal direction is divided into an upper chamber containing a moisture-absorbing agent and a lower chamber containing a liquid-collecting means and communicating with the upper chamber via a liquid-permeable means, wherein the tube is made of board coated with plastic and has at least one opening on a level with the upper chamber, a netting element, which has a least one fine-meshed netting portion, is so attached to the inside of the tube that the netting portion is located in front of said opening, and the liquid-collecting means consists of a liquid-tight container connected to the liquid-permeable means.

2. A device as set forth in claim 1, wherein the tube is made of corrugated fiberboard.

3. A device as set forth in claim 2, wherein the netting element has a collar corresponding to each opening in the tube, said collar having an outer circumferential shape that corresponds to the respective openings and extending into the opening so as to close flute tubes opening in said opening.

4. A device as set forth in any one of claim 1, wherein the netting element is made of plastic.

5. A device as set forth in claim 1, wherein the netting element is glued to the inside of the tube.

6. A device as set forth in claim 1, wherein the liquid-permeable means comprises a non-return valve means which is liquid permeable only in the direction from the upper chamber to the lower chamber.

7. A device as set forth in claim 1, wherein the liquid-collecting means is a plastic bag.

8. A device as set forth in claim 2, wherein the netting element is made of plastic.

9. A device as set forth in claim 3, wherein the netting element is made of plastic.

10. A device as set forth in claim 2, wherein the netting element is glued to the inside of the tube.

11. A device as set forth in claim 3, wherein the netting element is glued to the inside of the tube.

12. A device as set forth in claim 4, wherein the netting element is glued to the inside of the tube.

13. A device as set forth in claim 2, wherein the liquid-permeable means comprises a non-return valve means which is liquid permeable only in the direction from the upper chamber to the lower chamber.

14. A device as set forth in claim 3, wherein the liquid-permeable means comprises a non-return valve means which is liquid permeable only in the direction from the upper chamber to the lower chamber.

15. A device as set forth in claim 4, wherein the liquid-permeable means comprises a non-return valve means which is liquid permeable only in the direction from the upper chamber to the lower chamber.

16. A device as set forth in claim 5, wherein the liquid-permeable means comprises a non-return valve means which is liquid permeable only in the direction from the upper chamber to the lower chamber.

17. A device as set forth in claim 2, wherein the liquid-collecting means is a plastic bag.

18. A device as set forth in claim 3, wherein the liquid-collecting means is a plastic bag.

19. A device as set forth in claim 4, wherein the liquid-collecting means is a plastic bag.

20. A device as set forth in claim 5, wherein the liquid-collecting means is a plastic bag.

* * * * *